United States Patent
Liu

(10) Patent No.: US 11,704,478 B2
(45) Date of Patent: Jul. 18, 2023

(54) PAGE PROCESSING METHOD AND DEVICE, AND ELECTRONIC DEVICE

(71) Applicant: Lenovo (Beijing) Limited, Beijing (CN)

(72) Inventor: Cheng Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/679,649

(22) Filed: Feb. 24, 2022

(65) Prior Publication Data
US 2023/0036516 A1    Feb. 2, 2023

(30) Foreign Application Priority Data

Aug. 2, 2021    (CN) .......................... 202110880712.7

(51) Int. Cl.
G06F 16/00    (2019.01)
G06F 40/14    (2020.01)
G06F 16/957    (2019.01)

(52) U.S. Cl.
CPC ............ *G06F 40/14* (2020.01); *G06F 16/957* (2019.01); *G06F 16/9574* (2019.01)

(58) Field of Classification Search
None
See application file for complete search history.

(56) References Cited

U.S. PATENT DOCUMENTS

| | | | | |
|---|---|---|---|---|
| 5,557,674 A * | 9/1996 | Yeow | .................. | G06F 21/6218 713/193 |
| 6,560,224 B1 * | 5/2003 | Kung | .................. | H04L 65/1083 370/352 |
| 7,647,402 B2 * | 1/2010 | McBrearty | .......... | G06F 21/6218 709/225 |
| 8,219,900 B2 * | 7/2012 | Curtis | ................. | G06F 16/9577 715/201 |
| 8,407,482 B2 * | 3/2013 | Ghosh | ..................... | H04L 61/30 713/189 |
| 9,298,944 B2 * | 3/2016 | Kritt | .................... | G06F 21/6245 |
| 2005/0162668 A1 * | 7/2005 | Noda | ..................... | G06Q 10/10 358/1.1 |
| 2009/0049511 A1 * | 2/2009 | Manickam | .......... | G06F 21/6254 726/1 |
| 2010/0245938 A1 * | 9/2010 | Coley | ..................... | G06F 16/93 707/E17.005 |

OTHER PUBLICATIONS

J. Davis et al., "Methods of Information Hiding and Detection in File Systems," 2010 Fifth IEEE International Workshop on Systematic Approaches to Digital Forensic Engineering, 2010, pp. 66-69.*

(Continued)

*Primary Examiner* — Maikhanh Nguyen
(74) *Attorney, Agent, or Firm* — Anova Law Group, PLLC

(57) ABSTRACT

A page processing method. The method includes generating a loading masking directory when page data of a target page is being loaded, the loading masking directory including a data directory corresponding to a data module set to be loaded in the target page, and loading state information of data modules in the data module set; and displaying the loading masking directory at least during a loading period of the page data.

14 Claims, 8 Drawing Sheets

Determine directory entries corresponding to each data module in the data module set of the target page to obtain a directory entry set, and generate a data directory based on the director entry set — 201

Determine the loading state information of each data module in the data module set of the target page — 202

Generate the loading masking directory based on the data directory and the loading state information of each data module — 203

(56) References Cited

OTHER PUBLICATIONS

R. Gawlik et al. "Undermining Information Hiding (and What to Do about It)." In 25th {USENIX} Security Symposium ({USENIX} Security 16), pp. 105-119. 2016.*
Y. Ikawa et al., "A New Document Masking Approach for Removing Confidential Information", E-Commerce and the 4th IEEE International Conference on Enterprise Computing, 2007, 6 pages.*

* cited by examiner

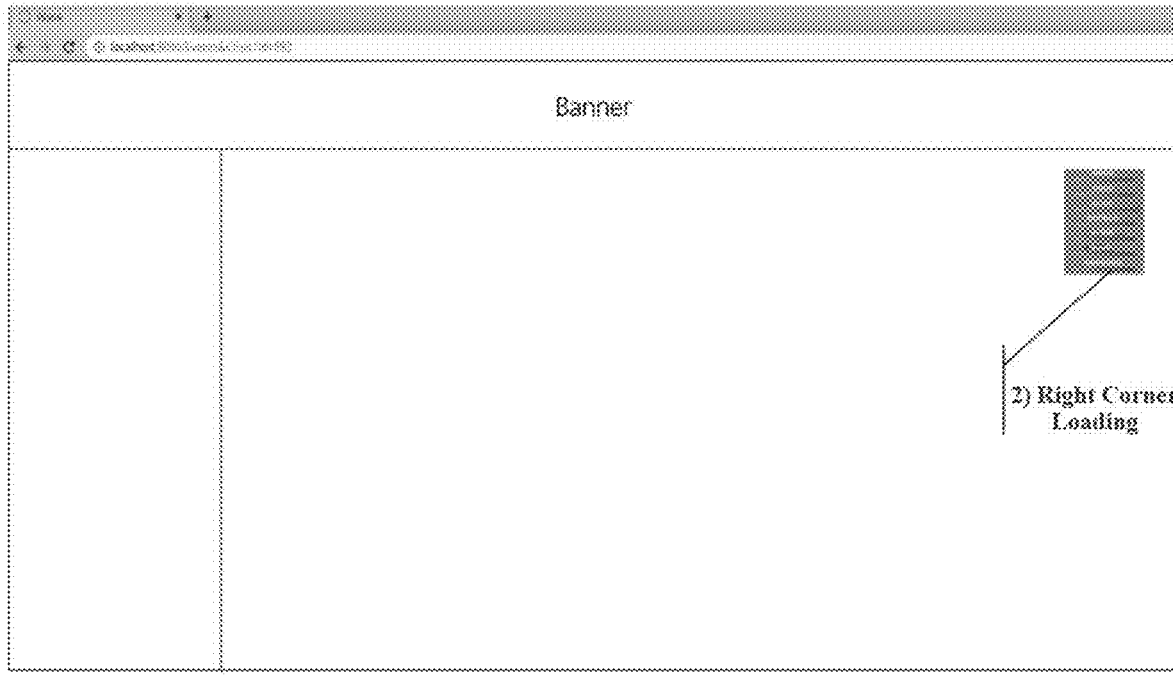

FIG. 7C

```
Generate a loading masking directory when paged data of
a target page is being loaded, the generated loading
masking directory including a data directory               101
corresponding to a data module set to be loaded on the
target page, and loading state information of data modules
              in the data module set
```

```
Display the loading masking directory at least during the    102
    loading period of the page data of the target page
```

```
Respectively generate and display corresponding refresh
controls for part of the directory entries in the loading
masking directory, the refresh controls corresponding to     106
the directory entries are used to reload the data modules
      corresponding to the directory entries
```

FIG. 8

PAGE PROCESSING METHOD AND DEVICE, AND ELECTRONIC DEVICE

CROSS-REFERENCES TO RELATED APPLICATION

This application claims priority to Chinese Patent Application No. 202110880712.7, filed on Aug. 2, 2021, the entire content of which is incorporated herein by reference.

FIELD OF TECHNOLOGY

The present disclosure relates to the field of page interaction and, more specifically, to a page processing method and device, and an electronic device.

BACKGROUND

When displaying data in a page form, due to the increase in the amount of data being called in the background, a certain loading time is required to load the page data. During the data loading time, a certain loading masking method is generally used to prompt the data loading.

The common page data loading masking methods mainly include the full-page single-image loading masking method and the loading masking method based on pre-loading information. The full-page single-image loading masking method refers to the process of masking with a dynamic loading image (e.g., a progress bar pattern that dynamically displays the loading progress), and then uniformly rendering the page after the data is loaded. The loading masking method based on the pre-loading information refers to the process of blank masking the page with a pre-loaded dynamic image, and then rendering and displaying the page data after the data is loaded. These two methods are based on a single masking image (e.g., a gif) for the loading prompt, and the prompt effect is limited, which limits the user experience.

BRIEF SUMMARY OF THE DISCLOSURE

One aspect of the present disclosure provides a page processing method. The method includes generating a loading masking directory when page data of a target page is being loaded, and displaying the loading masking directory at least during a loading period of the page data. The loading masking directory includes a data directory corresponding to a data module set to be loaded in the target page, and loading state information of data modules in the data module set.

Another aspect of the present disclosure provides a page processing device. The device includes a generating circuit configured to generate a loading masking directory when page data of a target page is being loaded, and a display circuit configured to display the loading masking directory at least during a loading period of the page data. The loading masking directory includes a data directory corresponding to a data module set to be loaded in the target page and loading state information of data modules in the data module set.

Another aspect of the present disclosure provides an electronic device. The electronic device includes a processor and a memory storing a computer instruction set that, when being executed by the processor, causes the processor to generate a loading masking directory when page data of a target page is being loaded, and display the loading masking directory at least during a loading period of the page data. The loading masking directory includes a data directory corresponding to a data module set to be loaded in the target page, and loading state information of data modules in the data module set.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

FIGS. 7A, 7B, and 7C are examples of respectively displaying the loading masking directory in a center position, a left corner position, and a right corner position of the target page according to an embodiment of the present disclosure.

FIG. 8 is a flowchart of the page processing method according to an embodiment of the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

By loading prompts using the single image masking method, a user can only understand the loading progress of the entire page, the loading process is invisible, and the user cannot understand the content of various topics/sections on the page and the various loading states of different topics/sections during the loading stage. The user cannot view the page content well, and cannot have a complete understanding of the page content (such as reports/topics) during the loading stage. In addition, with the conventional loading prompt method, the user can only passively wait for the loading to complete, and cannot flexibly interact with the page that is being loaded and masked.

In view of the foregoing, embodiments of the present disclosure provide a page processing method, a page processing device, and an electronic device. The method can be applied to browser applications running in numerous general-purpose or special-purpose computing device environments or configurations. In some embodiments, a general-purpose or special-purpose computing device environment or configuration may include, but is not limited to, a personal computer, a server computer, a handheld or personal device, a tablet-type device, a multi-processor device, and a distributed computing environment including any of the foregoing devices.

Figure 1:
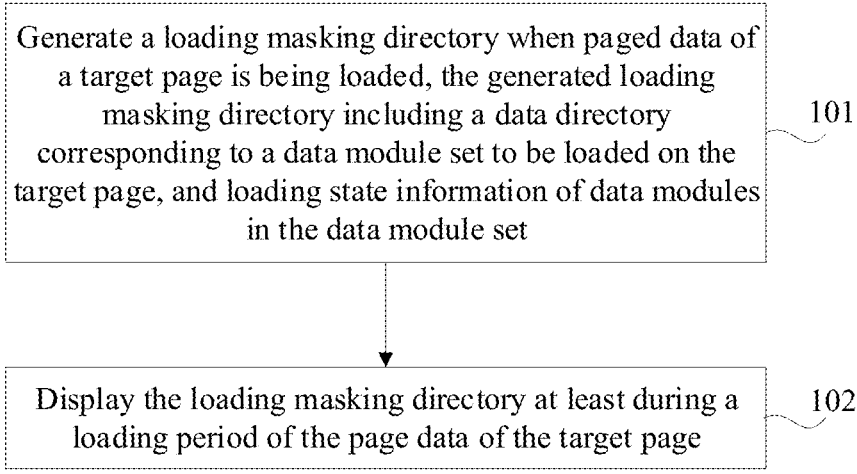
FIG. 1 is a flowchart of a page processing method according to an embodiment of the present disclosure.

FIG. 1 is a flowchart of a page processing method according to an embodiment of the present disclosure. The method will be described in detail below.

101, generating a loading masking directory when page data of a target page is being loaded.

In order to provide the user with more page information during the page loading stage, an embodiment of the present disclosure uses a loading masking in the form of a directory to prompt the page loading. The loading masking in the form of a directory is referred to as a loading masking directory in the embodiments of the present disclosure.

When the page data of the target page is being loaded, a corresponding loading masking directory for loading prompts may be generated. The generated loading masking directory may include a data directory corresponding to a data module set to be loaded on the target page, and respective loading state information corresponding to each data module in the data module set.

In some embodiments, the respective loading state information corresponding to each data module may be dynamic real-time loading state information.

Figure 2:
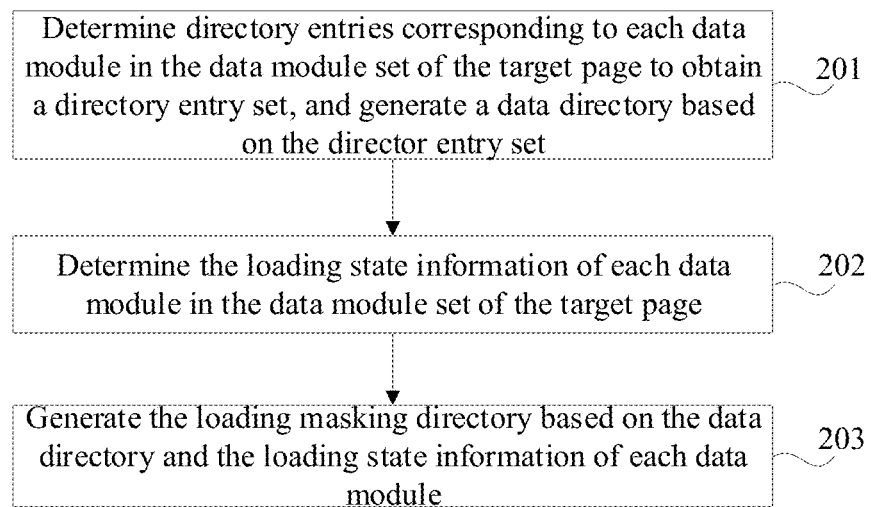
FIG. 2 is a process diagram of generating a loading masking directory for a target page according to an embodiment of the present disclosure.

Referring to FIG. 2, a process of generating the loading masking directory for the target page may be implemented as follow.

201, determining directory entries corresponding to each data module in the data module set of the target page to obtain a directory entry set, and generating a data directory based on the directory entry set.

In the embodiments of the present disclosure, for a page, such as a web page, corresponding basic information of a masking directory may be generated and configured in advance. More specifically, based on the data to be loaded on the page, the data modules may be divided, and a directory entry may be generated and configured for each divided module. Further, a list of data application programing interfaces (APIs) that need to be called for the page may be created based on the actual corresponding data API of each data module of the page. At the same time, in order to facilitate the monitoring of the loading state of each data module, the interface information of the corresponding data loading interface may be configured for the directory entry of each data module. Based on this, in some embodiments, the directory entries configured for each data module on the page and the interface information configured for each directory entry may be associated with each other, which can be collectively referred to as the basic information of the masking directory of the page. Alternatively, in some embodiments, at least the directory entries configured for each data module in the page may be used as the basic information of the masking directory of the page.

For example, for the homepage of a news website, the division of the sections to be loaded, the design of directory entries, and the associated configuration of API interface information may be carried out based on the news types. For example, "Entertainment" news may be divided into one section, which generally corresponds to one API, and "Sports" news may be divided into another section, which generally corresponds to another API, and each section may be regarded as a data module. In another example, for news article pages, the sections to be loaded may be divided by function. For example, the "comment section" may be divided into one section, the "news section" may be divided into another section, and other additional information sections such as advertisements may be divided into another section, etc. Each section may be considered as a data module, and directory entries may be designed for each section, as well as the associated configured of the API interface information.

Each data module may correspond to a topic data area of the page. In some embodiments, the directory entry generated for a data module may refer to, but is not limited to, a topic data title generated for the data module, or the extracted keywords of the data module, etc. to summarize the data content in the corresponding topic data area through the directory entries in the form of topic data titles or keywords, thereby allowing the user to understand the content of the data module as a whole.

Based on this, when the page data of the target page is being loaded, the basic information of the masking directory pre-configured for the target page may be obtained first. In some embodiments, the basic information of the masking directory obtained may include at least the directory entry set corresponding to each data module in the target page, and each directory entry in the directory entry set may correspond to the interface information of the corresponding data loading interface. A directory entry may correspond to the interface information of one or more data loading interfaces based on the actual situation.

Subsequently, each directory entry in the obtained masking directory basic information may be further extracted to obtain the directory entry set of the target page, and a data directory with a predetermined structure may be generated. The directory structure of the data directory may be, but is not limited to, a tree-like or graph-like directory structure.

202, determining the loading state information of each data module in the data module set of the target page.

In some embodiments, the loading state of each data loading interface of the target page may be monitored to obtain the loading state information of each data module of the target page based on the interface information corresponding to each directory entry in the directory entry set of the target page. The loading state information of the data module may include, but is not limited to, information such as whether the data has started to be loaded/stopped loading, and the current loading progress/loading percentage.

During the page data loading process, information such as the loading progress/loading percentage of each data module may change dynamically. Therefore, there is a need to continuously monitor the data loading interface corresponding to each data module to obtain real-time loading state information of each data module.

203, generating the loading masking directory based on the data directory and the loading state information of each data module.

After obtaining the real-time loading state information of each data module of the target page, the loading state information of each data module may be associated with the corresponding directory entry in the data directory of the data module to obtain the loading masking directory.

102, displaying the loading masking directory at least during the loading period of the page data of the target page.

Subsequently, the generated loading masking directory may be displayed on the page area of the target page for loading prompts.

It should be understood that in the loading stage, the loading masking directory being displayed on the target page is generally a combined information structure of a fixed data directory and the dynamically changing loading state information (e.g., loading progress) associated with each directory. However, the loading masking directory being displayed on the target page is not limited thereto. If the page content of a certain page changes in real time, for example, a certain data topic/section is added to the page online, a refresh function of the loading masking directory that will be described later may be used such that the data directory of the loading masking directory being displayed on the page before and after the refresh can change synchronously.

In the process at 102, in some embodiments, each directory entry of its data directory may be displayed on the target page, and the loading state information of the corresponding data module may be displayed in association with each directory entry only in the loading stage.

Alternatively, in some embodiments, each directory entry of its data directory may be displayed on the target page and the loading state information of the corresponding data module may be displayed in association with each directory entry during the loading stage and the page data display stage after the loading is completed. That is, in some embodiments, in addition to displaying the loading masking directory during the loading state, the loading masking directory may also be displayed in the page data display stage of the target page after the loading is completed based on requirements.

For the above implementation, the loading masking directory may be permanently displayed in the page area of the target page or temporarily displayed in the page area of the target page during the page loading stage and the display stage after the loading is completed. For example, when the page data loading is completed and the loading stage enters the display stage, the loading masking directory may be automatically hidden. Alternatively, during the page loading process or the page data display process after the loading is completed, based on an automatic timing function (e.g., by integrating a timer in the loading masking directory), when a set duration is reached, the loading masking directory may be automatically hidden. Or, the loading masking directory may be permanently displayed during the loading and display stages until the user manually closes it.

In some embodiments, the directory entries configured for each data module of the target page and the interface information of the data loading interface configured for each directory entry may be declared in the global variables. When the target page is being loaded, based on the relevant information declared in the global variables, each directory entry corresponding to the target page may be obtained to create a loading page masking layer component including the data directory structure. Further, the loading of the interface may be dynamically monitored based on the API that each data module of the page needs to call, and at the same time, the loading state information (such as the loading progress) obtained from the monitoring may be displayed in the loading masking directory.

Figure 3:
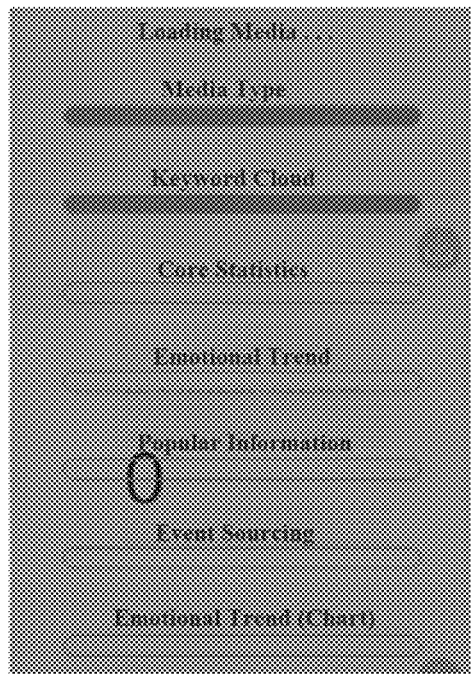
FIGS. 3 and 4 are different examples of the loading masking directory provided in the present disclosure.
Figure 4:
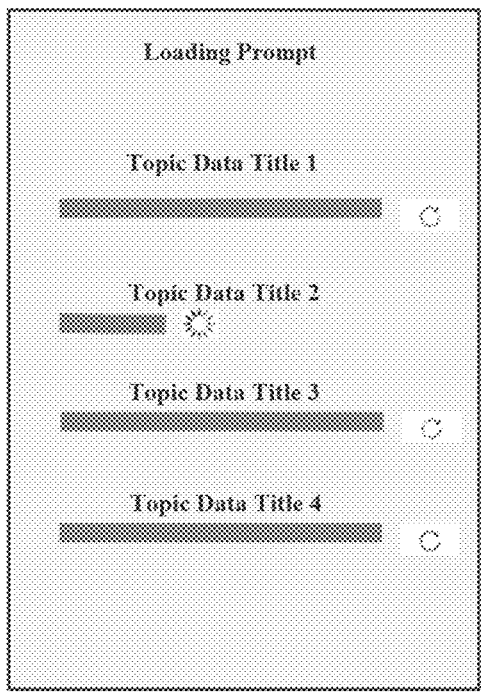
Figure 5:
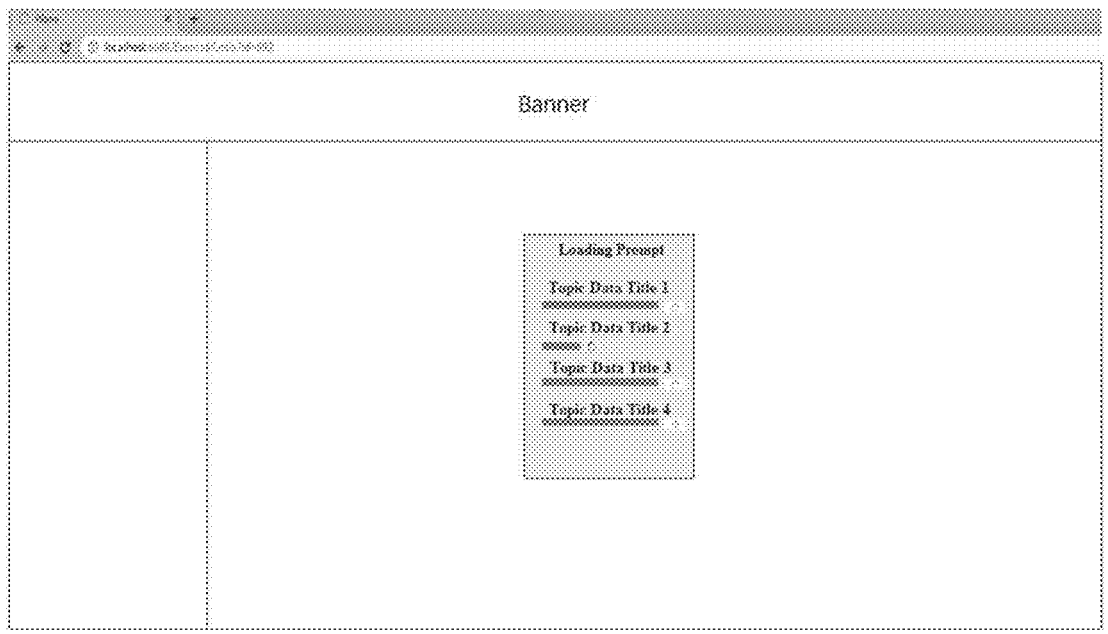
FIG. 5 is an example of displaying a generated loading making directory in a page area according to an embodiment of the present disclosure.

FIGS. 3 and 4 are different examples of the loading masking directory provided in the present disclosure. Each text entry in the FIG. 3 and FIG. 4 represents a directory entry of a corresponding data module, and each progress bar in the FIG. 3 and FIG. 4 represents the loading progress of the data module of the corresponding directory entry. In addition, FIG. 5 shows an example of a generated loading making directory being displayed in a page area.

It can be seen from the technical solution described above that the page processing method provided in the present disclosure can generate a loading masking directory when loading page data, and display the generated loading masking directory at least during the page loading time. That is, the present disclosure provides a page loading prompt in the form of a loading masking directory. In some embodiments, the loading masking directory used for prompting page loading may include a data directory corresponding to the data module set of the loaded page, and the loading state information of each data module. Accordingly, based on the loading masking method of the present disclosure, the user can at least understand the relevant data content of each data module of the page in the form of a directory in the page loading stage, and can understand the respective loading state information of each data module, thereby realizing the visual display of page data topics at least in the loading stage, making the relevant content of different topics on the page and their respective loading stages visible during the loading process, further enriching the data interaction with users and improving user experience.

In some embodiments, during the page data loading process of the target page, a target data module that has been loaded in the data module set of the target page may also be determined, and the data content of the target data module may be displayed at a corresponding position on the target page. For example, assume that the data content of the "Sports" section on the homepage of the news website has been loaded, but the data content of the "Entertainment" section has not been loaded. In the loading stage, the data content of the "Sports" section may be displayed first in the corresponding position of the "Sports" section of the target page, while the "Entertainment" section may not be displayed.

Figure 6:
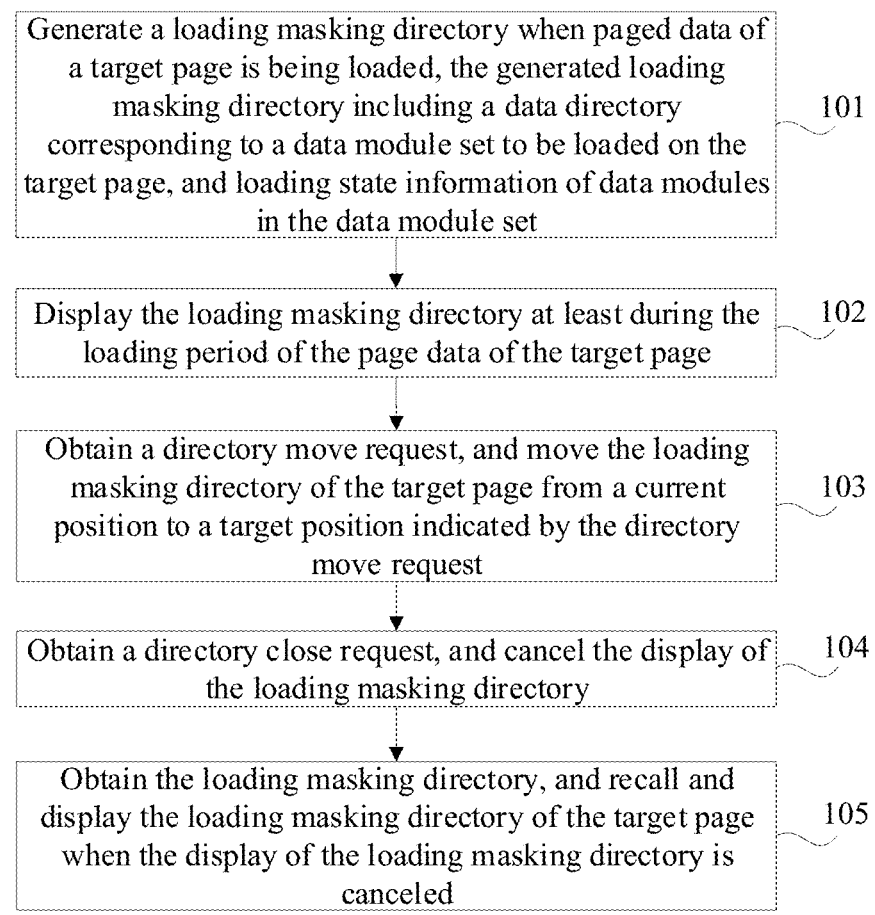
FIG. 6 is a flowchart of the page processing method according to an embodiment of the present disclosure.

FIG. 6 is a flowchart of the page processing method according to an embodiment of the present disclosure. In some embodiments, after the process at 102, the page processing method of the present disclosure may further include any one or more of the following processes.

103, obtaining a directory move request and moving the loading masking directory of the target page from a current position to a target position indicated by the directory move request.

In this embodiment, the loading masking of the page evolves from a monotonous loading and waiting process to a multi-interaction process, which supports the user to perform interactive operations such as moving, closing, or recalling the loading masking directory being displayed in the page area.

The use may indicate the target position for the loading masking directory through drag and drop, gesture or menu operations, or information configurations, etc. based on the requirements, and move the loading masking directory from the current position of the target page to the indicated target position, thereby realizing the movement of the loading masking directory. Correspondingly, based on the requirements, the loading masking directory can be flexibly arranged in a center position, a left/right/upper/lower corner position, or other positions of the target page through the movement operation.

Figure 7A:
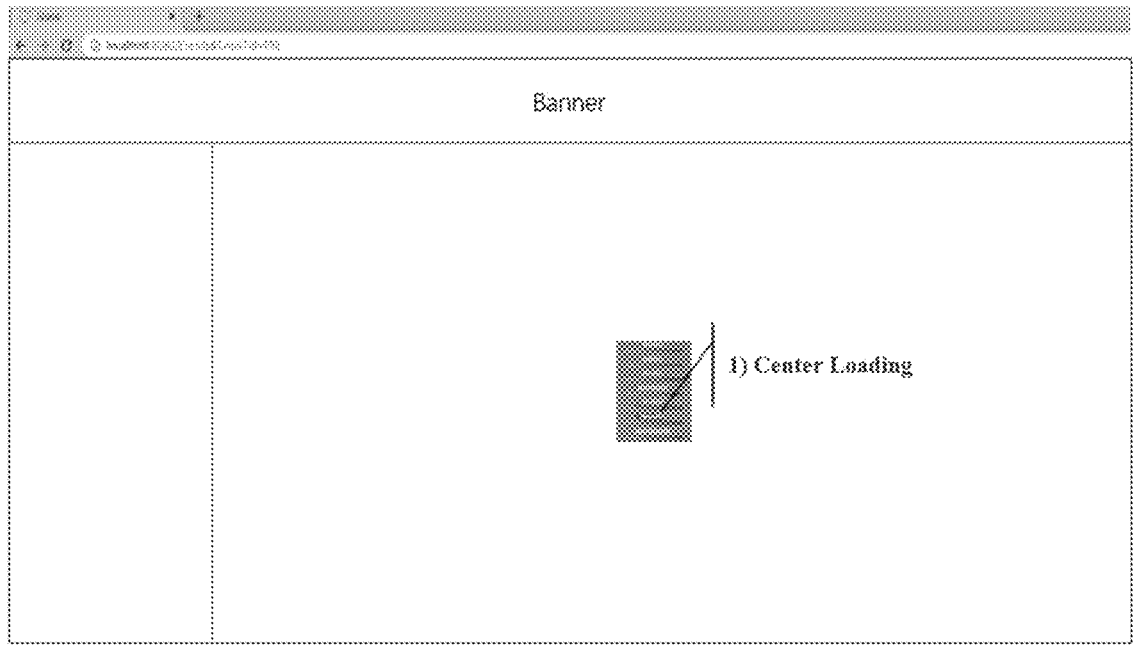
Figure 7B:
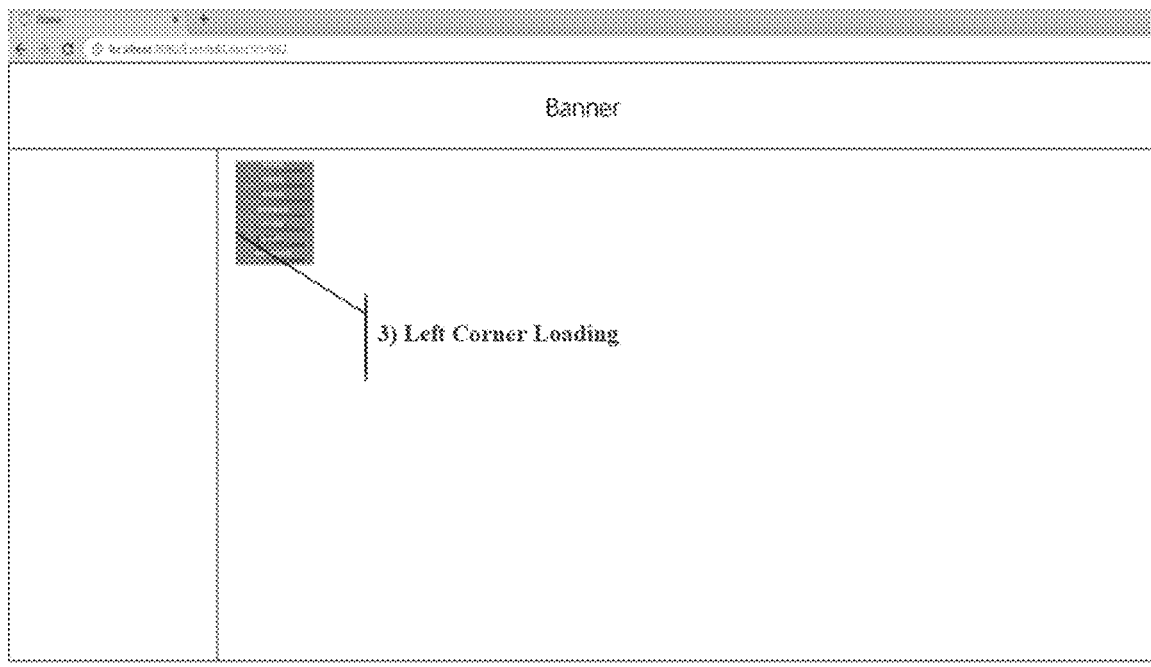

Referring to FIGS. 7A-7C. FIGS. 7A-7C are examples of respectively displaying the loading masking directory in a center position, a left corner position, and a right corner position of the target page according to an embodiment of the present disclosure.

104, obtaining a directory close request and cancel the display of the loading masking directory.

If the user does not need to view the loading masking directory, for example, during the page loading stage or the page data display stage after the loading is completed, the user may perform a corresponding closing operation, such as by operating the target page, operating the controls set on the loading masking directory to close the loading masking directory, operating on a specific shortcut key, or performing a predetermined gesture, etc. to trigger the directory close request. The system can receive and respond to the request, and cancel the display of the loading masking directory.

105, obtaining a directory display request and calling and displaying the loading masking directory of the target page when the displayed of the loading masking directory is cancelled.

Corresponding to the function of canceling the display of the loading masking directory. If the loading masking directory is closed and the user needs to view the loading masking directory again, for example, in the process of displaying the page data, the user needs to quickly and comprehensively understand the content of different sections based on the loading masking directory, a directory display request may be triggered by operating the controls set on the target page to call out the loading masking directory, operating on a specific shortcut key, or performing a predetermined gesture, etc. The system can receive and respond to the request, and call and display the loading masking directory of the target page to redisplay the loading masking directory.

In this embodiment, the loading masking of the page evolves from a monotonous loading and waiting process to a multi-interaction process, which improves the human-machine interaction effect between the user and the page during the page loading stage and/or the page data display stage after the loading is completed.

FIG. 8 is a flowchart of the page processing method according to an embodiment of the present disclosure. In some embodiments, after the process at 102, the page processing method may further include the following process.

106, respectively generating and displaying corresponding refresh controls for at least part of the directory entries, where the refresh controls corresponding to the directory entries are being used to reload the data modules corresponding to the directory entries.

In this embodiment, for at least part of the directory entries in the loading masking directory, the corresponding refresh controls can be generated and displayed. By setting the entry-level refresh controls, the reloading of data modules corresponding to the directory entries can be supported.

Figure 9A:
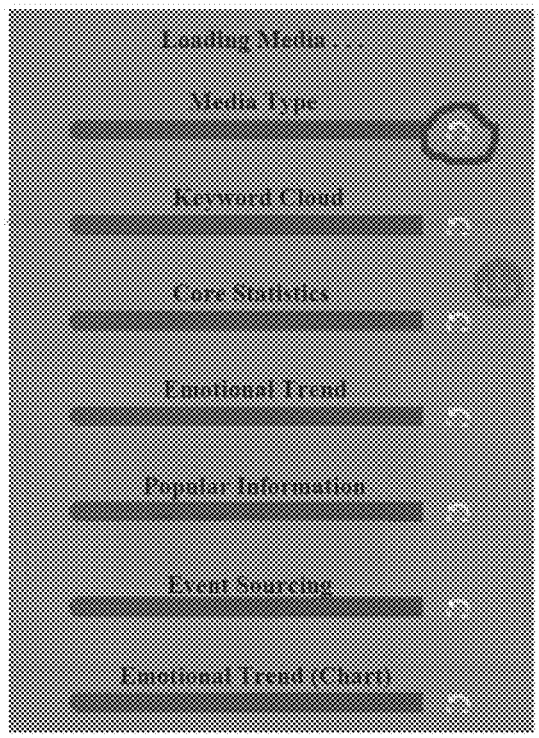
FIGS. 9A and 9B are examples of respectively generating and displaying corresponding refresh controls for at least part of directory entries according to an embodiment of the present disclosure.
Figure 9B:
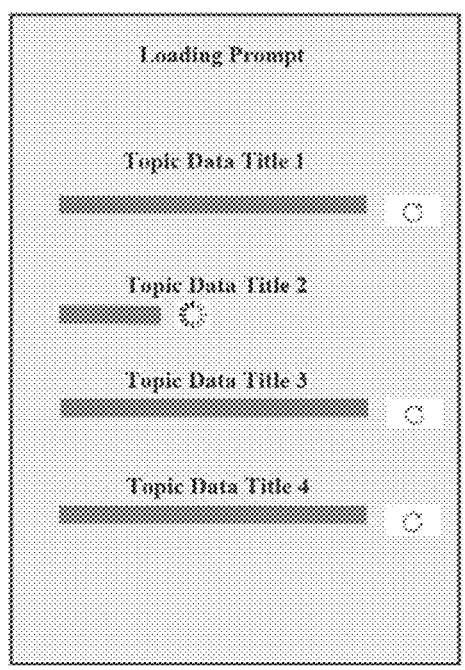

In some embodiments, in some embodiments, the corresponding refresh controls may only be set for the data modules that have been loaded. FIGS. 9A and 9B are examples of respectively generating and displaying the corresponding refresh controls for at least part of directory entries according to an embodiment of the present disclosure.

Based on the requirements, the user may refresh of the data module corresponding to the directory entry individually by operating on the refresh controls associated with the desired directory entry, thereby reloading only the data content corresponding to the operated refresh controls in a targeted manner. In practice, the corresponding API may be call to achieve the targeted data block refresh based on the API information declared in the global variables corresponding to the entry indicated by the refresh operation.

For example, assume that in FIG. 9A, the topic data title 3 corresponds to the "comment section" data block in the news page, the user may load the real-time comment information in the data block by operating on the refresh controls associated with the topic data tile 3 to refresh the content of the comment section.

In some embodiments, a refresh control for reloading all data modules of the page may also be set on a toolbar of the target page and/or the corresponding area of the loading masking directory for the overall loading masking directory. When the user needs to refresh all page content, the user may trigger the reloading of all page content by using this refresh control.

In this embodiment, based on the needs, the user can selectively reload part of the data content of the page based on the loading masking directory, which further improves the human-machine interaction effect between the user and the page during the page loading stage and/or the page data display stage after the loading is completed.

Figure 10:
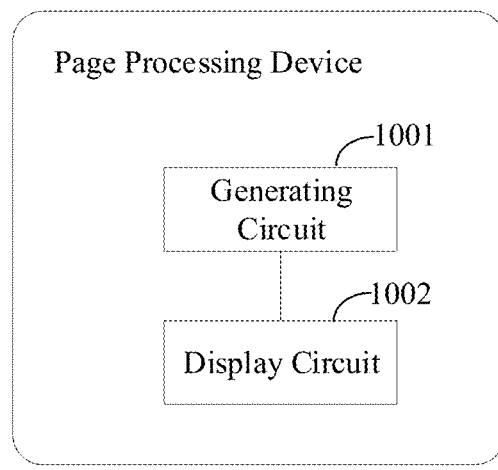
FIG. 10 is a schematic structural diagram of a page processing device according to an embodiment of the present disclosure.

Corresponding to the page processing method described above, an embodiment of the present disclosure further provides a page processing device. FIG. 10 is a schematic structural diagram of a page processing device according to an embodiment of the present disclosure. As shown in FIG. 10, the page processing device includes a generating circuit 1001. The generating circuit 1001 may be configured to generate a loading masking directory when loading page data of a target page. In some embodiments, the loading masking directory may include a data directory corresponding to the data module set to be loaded in the target page, and the /loading state information of the data modules in the data module set. The page processing device includes a display circuit 1002. The display circuit 1002 may be configured to display the loading masking directory at least during the loading period of the page data.

In some embodiments, the generating circuit 1001 may be configured to determine the directory entries corresponding to each data module in the data module set to obtain a directory entry set, and generate a data directory based on the directory entry set; determine the loading state information of each data module in the data module set; and generate the loading masking directory based on the data directory and the loading state information of each data module.

In some embodiments, when the directory entry corresponding to each data module in the data module set of the target page is determined, the directory entry set is obtained, and the loading state information of each data module in the data module set is determined, the generating circuit 1001 may be configured to obtain the pre-configured masking directory basic information of the target page. The masking directory basic information may include at least a directory entry set. Each directory entry in the directory entry set may correspond to the interface information of the corresponding data loading interface, and the directory entry in the directory entry set may be the directory entry corresponding to the corresponding data module in the data module set. The generating circuit 1001 may be further configured to extract each directory entry in the masking directory basic information to obtain the directory entry set, and monitor the data loading state of each data loading interface based on the interface information corresponding to each directory entry in the directory entry set to obtain the loading state information of each data module.

In some embodiments, when generating the loading masking directory based on the data directory and the loading state information of each data module, the generating circuit 1001 may be configured to associate the loading state information of each data module with the corresponding directory entry of the data module in the data directory to obtain the loading masking directory.

In some embodiments, the display circuit 1002 may be configured to display each directory entry of the data directory on the target page, and display the loading state information of the corresponding data module associated with each directory entry during the loading period of the page data; or, display each directory entry of the data directory on the target page, and display the loading state information of the corresponding data module associated with each directory entry during the loading period of the page data and the display period of the page data after the loading is completed.

In some embodiments, the page processing device may further include an operation processing circuit. The operation processing circuit may be configured to obtain a directory move request, and move the loading masking directory from the current position to the target position indicated by the directory move request; and/or, obtain a directory close request, and cancel the display of the loading masking directory; and/or, obtain a directory display request, and call and display the loading masking directory when the display of the loading masking directory is cancelled.

In some embodiments, the generating circuit 1001 may be further configured to respectively generate the corresponding refresh controls for at least part of the directory entries and trigger the display circuit 1002 to display the generated refresh controls. In some embodiments, the refresh controls corresponding to the directory entries may be used to reload the data modules corresponding to the directory entries.

In some embodiments, the display circuit 1002 may be further configured to determine the target data module that has been loaded in the data module set of the target page, and display the data content of the target data module on the target page during the page data loading process of the target page.

For the page processing device provided in the embodiments of the present disclosure, since the page processing device corresponds to the page processing method provided in the embodiments of the present disclosure, the description of the page processing device is relatively brief. For description of related parts of the device embodiments, reference may be made to the description of the related parts of the method embodiments, which will not be repeated here.

An embodiment of the present disclosure further provides an electronic device. The electronic device may be, but is not limited to, a personal computer, a server computer, a hand-held or portable device, a tablet-type device, a multi-processor device, or a distributed computing environment device including any of the foregoing devices.

Figure 11:
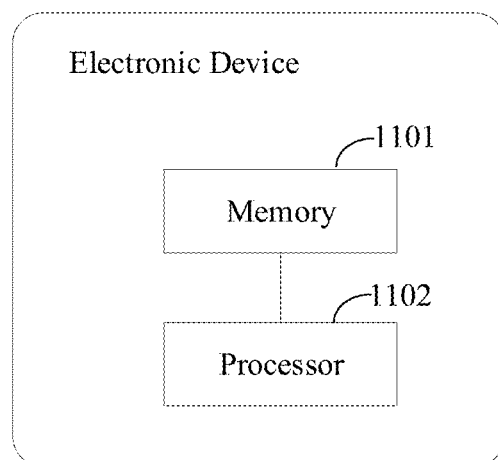
FIG. 11 is a schematic structural diagram of an electronic device according to an embodiment of the present disclosure.

FIG. 11 is a schematic structural diagram of an electronic device according to an embodiment of the present disclosure. As shown in FIG. 11, the electronic device includes a memory 1101 for storing a computer instruction set. The computer instruction set may be implemented in the form of a computer program. In some embodiments, the memory 1101 may include a high-speed random-access memory, and may also include a non-volatile memory, such as at least one magnetic disk storage device, flash memory device, or other volatile solid-state storage devices. The electronic device further includes a processor 1102. The processor 1102/may be configured to implement the page processing method according to any of the above method embodiments by executing the instruction set stored in the memory.

In some embodiments, the processor 1102 may be a central processing unit (CPU), an application-specific integrated circuit (ASIC), a digital signal processor (DSP), a field programmable gate array (FPGA), or other programmable logic devices, etc.

In addition, the electronic device may also include components such as a communication interface, a communication bus, etc. The memory, the processor, and the communication interface may communicate with each other through the communication bus.

The communication interface may be used for communication between the electronic device and other devices. The communication bus may be a peripheral component interconnect (PCI) bus or an extended industry standard architecture (EISA) bus, etc. The communication bus may be divided into an address bus, a data bus, a control bus, etc.

In this embodiment, by executing the computer instruction set stored in the memory, the processor in the electronic device may generate a loading masking directory when loading page data of the target page, and display the generated loading masking directory at least during the page loading time. That is, the present disclosure provides a page loading prompt in the form of a loading masking directory. In some embodiments, the loading masking directory used for prompting page loading may include a data directory corresponding to the data module set of the loaded page, and the loading state information of each data module. Accordingly, based on the loading masking method of the present disclosure, the user can understand the relevant data content of each data module of the page in the form of a directory in the page loading stage, and can understand the respective loading state information of each data module, thereby realizing the visual display of page data topics at least in the loading stage, making the relevant content of different topics on the page and their respective loading stages visible during the loading process, further enriching the data interaction with users and improving user experience.

Consistent with the present disclosure, the page processing method and device, and the electronic device provided in the embodiments of the present disclosure provide at least the following benefits compared with the conventional loading masking processing methods.

1) During the page data loading process, users can more clearly obtain the content directory of the pages such as reports/topics, and can have a more complete understanding of the page content.

2) By displaying each data topic of the page in the form of a directory, and providing differentiated loading states of different topics by monitoring each topic API that needs to be loaded, the loading process is visible, and the data interaction is smoother.

3) The loading masking process evolves from a monotonous loading and waiting process to a multi-interaction process, which supports users to interact with the loading masking directory being displayed in the page area by dragging and moving, closing, or recalling the display.

4) Users can refresh the API data that needs to be refreshed separately in the loading masking directory based on actual needs. Accordingly, from the user experience (UX) of the human-machine interaction, users can obtain the data content of related topics/sections (e.g., only reload the latest comment data based on the refresh operation) in a more readable and targeted manner.

It should be noted that the various embodiments in the present specification are described in a progressive manner, and each embodiment focuses on differences from other embodiments, and the same similar parts between the various embodiments can be referred to each other.

For the convenience of description, when describing the above system or device, the function is divided into various modules or units and described separately. Of course, when implementing the embodiments of the present disclosure, the function of each unit may be implemented in the same or multiple software and/or hardware.

A method according to the embodiments of the disclosure can be realized by means of software plus a hardware platform, or can be realized by a hardware platform. Embodiments of the present disclosure can be implemented in the form of a software product stored in a storage medium (such as ROM, RAM, magnetic disc, or optical disc), which may include a number of instructions for enabling an electronic device, e.g., a mobile phone, a computer, a server, an air conditioner, or a network device, or the like, to perform a method consistent with the disclosure, such as one of the methods described above.

The terms "first," "second," "third," "fourth," or the like in the specification are merely used to distinguish an entity or an operation from another entity or operation, and are not intended to require or indicate that there is any such physical relationship or sequence between these entities or operations. In addition, the terms "including," "comprising," and variants thereof herein are open, non-limiting terminologies, which are meant to encompass a series of elements of processes, methods, items, or devices. Not only those elements, but also other elements that are not explicitly listed, or elements that are inherent to such processes, methods, items, or devices. In the absence of more restrictions, the elements defined by the statement "include a/an . . . " not preclude that other identical elements are included in the processes, methods, items, or devices that include the elements.

The embodiments disclosed herein are merely examples. Other applications, advantages, alternations, or modifications of, or equivalents to the disclosed embodiments are obvious to a person skilled in the art and are intended to be encompassed within the scope of the present disclosure.

What is claimed is:

1. A page processing method comprising:
   generating a loading masking directory when page data of a target page is being loaded, the loading masking directory including a data directory corresponding to a data module set to be loaded in the target page, and loading state information of data modules in the data module set; and
   displaying the loading masking directory at least during a loading period of the page data;
   wherein generating the loading masking directory includes:
   determining a directory entry corresponding to each data module in the data module set to obtain a directory entry set, and generating a data directory based on the directory entry set;
   determining the loading state information of each data module in the data module set; and
   generating the loading masking directory based on the data directory and the loading state information of each data module,
   and wherein determining the directory entry corresponding to each data module in the data module set to obtain the directory entry set, and determining the loading state information of each data module in the data module set include:
   obtaining pre-configured masking directory basic information of the target page, the masking directory basic information including the directory entry set, each directory entry in the directory entry set corresponding to interface information of a corresponding data loading interface, the directory entry in the directory entry set being the directory entry corresponding to the corresponding data module in the data module set;
   extracting each directory entry in the masking directory basic information to obtain the directory entry set; and
   monitoring the loading state information of each data loading interface to obtain the loading state information of each data module based on the interface information corresponding to each directory entry in the directory entry set.

2. The method of claim 1, wherein generating the loading state information based on the data directory and the loading state information of each data module includes:
   associating the loading state information of each data module with the corresponding directory entry of the data module in the data directory to obtain the loading masking directory.

3. The method of claim 2, wherein displaying the loading masking directory at least during the loading period of the page data includes:
   displaying each directory entry of the data directory on the target page, and displaying the loading state information of the corresponding data module corresponding to each directory entry during the loading period of the page data; or,
   displaying each directory entry of the data directory on the target page, and displaying the loading state information of the corresponding data module corresponding to each directory entry during the loading period of the page data and a display period of the page data after the loading is completed.

4. The method of claim 3, wherein after displaying the loading masking directory, further comprising:
   obtaining a directory move request, and moving the loading masking directory from a current position to a target position indicated by the directory move request; and/or,
   obtaining a directory close request, and cancelling the display of the loading masking directory; and/or,
   obtaining the loading masking directory, and calling and displaying the loading masking directory when the display of the loading masking directory is canceled.

5. The method of claim 3, wherein displaying the loading masking directory further includes:
   respectively generating and displaying corresponding refresh controls for at least part of the directory entries, the refresh controls corresponding to the directory entries being used to reload the data modules corresponding to the directory entries.

6. The method of claim 1 further comprising:
   determining a target data module that has been loaded in the data module set, and displaying data content of the target data module on the target page during a loading process of the page data.

7. A page processing device comprising:
   a generating circuit configured to generate a loading masking directory when page data of a target page is being loaded, the loading masking directory including a data directory corresponding to a data module set to be loaded in the target page, and loading state information of data modules in the data module set; and a display circuit configured to display the loading masking directory at least during a loading period of the page data;

wherein the generating circuit is further configured to:
  determine a directory entry corresponding to each data module in the data module set to obtain a directory entry set, and generate a data directory based on the directory entry set;
  determine the loading state information of each data module in the data module set; and
  generate the loading masking directory based on the data directory and the loading state information of each data module, and wherein the generating circuit is further configured to:
  obtain pre-configured masking directory basic information of the target page, the masking directory basic information including the directory entry set, each directory entry in the directory entry set corresponding to interface information of a corresponding data loading interface, the directory entry in the directory entry set being the directory entry corresponding to the corresponding data module in the data module set;
  extract each directory entry in the masking directory basic information to obtain the directory entry set; and
  monitor the loading state information of each data loading interface to obtain the loading state information of each data module based on the interface information corresponding to each directory entry in the directory entry set.

8. The device of claim 7, wherein the generating circuit is further configured to:
  associate the loading state information of each data module with the corresponding directory entry of the data module in the data directory to obtain the loading masking directory.

9. The device of claim 8, wherein the display circuit is further configured to:
  display each directory entry of the data directory on the target page, and displaying the loading state information of the corresponding data module corresponding to each directory entry during the loading period of the page data; or,
  display each directory entry of the data directory on the target page, and displaying the loading state information of the corresponding data module corresponding to each directory entry during the loading period of the page data and a display period of the page data after the loading is completed.

10. The device of claim 9 further comprising:
  an operation processing circuit, the operation processing circuit being configured to: obtain a directory move request and move the loading masking directory from a current position to a target position indicated by the directory move request; and/or,
  obtain a directory close request and cancel the display of the loading masking directory; and/or,
  obtain the loading masking directory, and call and display the loading masking directory when the display of the loading masking directory is canceled.

11. The device of claim 9, wherein the generating circuit is further configured to:
  generate corresponding refresh controls for at least part of the directory entries, the refresh controls corresponding to the directory entries being used to reload the data modules corresponding to the directory entries; and
  trigger the display circuit to display the generated refresh controls.

12. The device of claim 7, wherein the display circuit is further configured to:
  determine a target data module that has been loaded in the data module set, and display data content of the target data module on the target page during a loading process of the page data.

13. An electronic device comprising:
  a processor; and
  a memory storing a computer instruction set that, when being executed by the processor, causes the processor to:
    generate a loading masking directory when page data of a target page is being loaded, the loading masking directory including a data directory corresponding to a data module set to be loaded in the target page, and loading state information of data modules in the data module set; and
    display the loading masking directory at least during a loading period of the page data,
  wherein the program instructions further cause the processor to:
    determine a directory entry corresponding to each data module in the data module set to obtain a directory entry set, and generating a data directory based on the directory entry set;
    determine the loading state information of each data module in the data module set; and
    generate the loading masking directory based on the data directory and the loading state information of each data module;
  and wherein the program instructions further cause the processor to:
    obtain pre-configured masking directory basic information of the target page, the masking directory basic information including the directory entry set, each directory entry in the directory entry set corresponding to interface information of a corresponding data loading interface, the directory entry in the directory entry set being the directory entry corresponding to the corresponding data module in the data module set;
    extract each directory entry in the masking directory basic information to obtain the directory entry set; and
    monitor the loading state information of each data loading interface to obtain the loading state information of each data module based on the interface information corresponding to each directory entry in the directory entry set.

14. The electronic device of claim 13, wherein the program instructions further cause the processor to:
  associate the loading state information of each data module with the corresponding directory entry of the data module in the data directory to obtain the loading masking directory.

* * * * *